L. C. PRINDLE.
Improvement in Curtain-Fixtures.
No. 5,135. Reissued Nov. 5, 1872.
FIG. I.
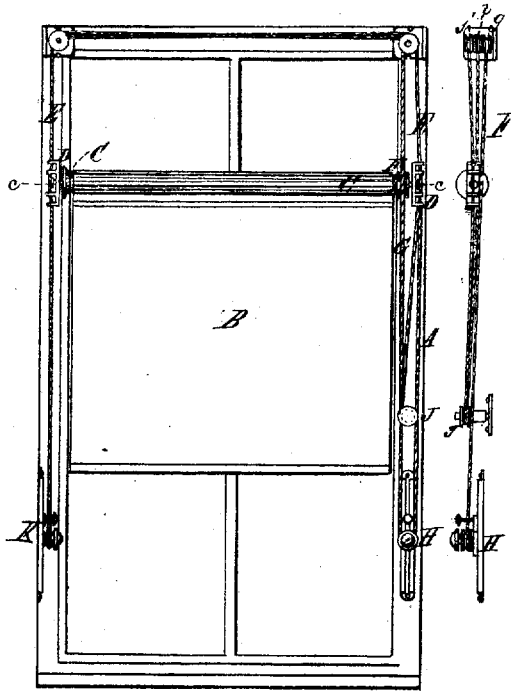
Fig. 2.
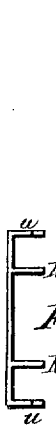
Fig. 4.
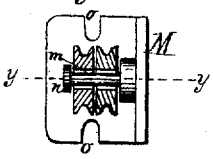
Fig. 6.
Fig. 5.
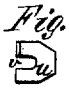
Fig. 7.
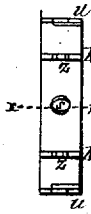
Fig. 8.
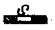
FIG. III.
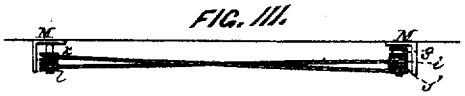
Fig. 9.
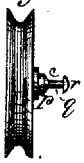
Witnesses.
J. C. Peck
H. E. Peck
Inventor:
L. C. Prindle
By C. C. Peck
Attorney.
AM. PHOTO-LITHOGRAPHIC CO. N.Y. (OSBORNE'S PROCESS.)

UNITED STATES PATENT OFFICE.

L. CORYDON PRINDLE, OF CHICAGO, ILLINOIS, ASSIGNOR OF PART INTEREST TO HENRY L. HALL, OF SAME PLACE.

IMPROVEMENT IN CURTAIN-FIXTURES.

Specification forming part of Letters Patent No. 114,852, dated May 16, 1871; reissue No. 5,135, dated November 5, 1872.

*To all whom it may concern:*

Be it known that I, L. CORYDON PRINDLE, of the city of Chicago, in the county of Cook and State of Illinois, have invented certain Improvements in Curtain-Fixtures, of which the following is a specification:

*Nature of the Invention.*

My invention relates to curtain-fixtures, having specially in view a more convenient and perfect means for operating and producing both a vertical and rotary movement of the roller on which the curtain or shade is fastened by the pulling of a single cord, as hereinafter described.

*General Description.*

In the drawing, Figure 1 is a front elevation of a window fitted with a curtain and fixtures made according to my invention; Fig. 2 is a side elevation of the fixtures; Fig. 3 is a top-plan view of same, showing the way in which the cord crosses; Fig. 4 is a view of the corner-pulleys and their method of attachment, the pulleys being in section; Fig. 5 is an end view of the cord-holder, enlarged; Fig. 6 is a side view of the same; Fig. 7 is a front view of the same; Fig. 8 is a section on line *x x*, Fig. 7; and Fig. 9 is an enlarged view of the pivot to bear the cord-holder.

Like letters of reference made use of in the several figures indicate like parts.

A is the frame or casing of an ordinary window. B is the curtain, which is supported on the roller C. This roller is furnished at each end with a pivot, *c*, bearing in a clutch or holder, D, which holder clasps a cord, E, by means of which the roller is raised or lowered bodily. This roller is also furnished with the ordinary rigid grooved pulley F, around which the cord G makes a turn, and, being endless, passes over the pulley *g* at the top of the casing and around the pulley in tightener H, placed near the bottom of the casing. This cord operates to turn the roller and roll up the curtain. The cord E is endless and passes around the pulley J, placed near the bottom of the casing. Both parts or plies then pass up around two pulleys, *i j*. The plies then cross one another, as seen in Fig. 3, after which they pass around the pulleys *k l* and down the other side of the casing to the pulley in tightener K, over which the bight is hooked. The roller C is attached to the outside ply of the cord E, which, by reason of the cross at the top, becomes, at each side of the casing, the ascending or descending ply, as the case may be, on both sides alike. The pulleys *i j k l* are made with an aperture to receive a spindle, upon which they revolve. This spindle, marked *m* in the drawing and seen clearly in Fig. 4, is made somewhat smaller in diameter than the aperture in the pulleys, but is furnished with a head, *n*, at the outer extremity, of just the same size as the aperture, so that the pulleys may be slipped upon the spindle and will remain without riveting or otherwise fastening. The pulleys J and *g* are made in like manner, and the pulley *g* is carried upon the same spindle as the pulleys *i j*. The bases or flanges M of the pulleys *i j k l g*, to which are attached the spindles, are made right-angled, as seen at Fig. 3, so that these pulleys may be attached to the window-casings, either of that portion parallel to the plane of the window or at right angles thereto. This flange or base is provided with screw-holes in the form of slots, as at *o o*, and by this construction the base and spindle may be cast in one piece by dividing the pattern on the line *y y* of Fig. 4. The pivots *c*, which project from the end of the roller C and bear in the holders D, are made, as shown at Fig. 9, with collar *p*, bearing *q*, and rounded head *r*; and the aperture *s* in the holder, Figs. 7 and 8, is made oblong, with its greatest diameter transversely to the length of the holder. The aperture *s* is also made with a beveled edge. The pivot *c* may be placed in this aperture by tipping it up until the head catches past the beveled edge, when it may be brought straight and the parts engaged. The holder D is furnished at each end with the projecting parts *u u*, each of which contains a slot, *v*, Fig. 5. Between these projecting parts arise two bridges, N N, provided with V-shaped notches *z z*, in which rests the cord. In attaching the cord to the holder it is made to pass through the slots and over the bridges, so that any downward or upward strain upon the holder tends to draw the cord more firmly into the notches *z z* of the bridges and to render the holder immovable upon the cords. The tighteners, shown near the bottom of the casing in Fig. 1 at H and K, to which the pulleys are attached for the cords E and G, are provided with means for tightening and giving proper tension to the cords E and G, and may be of the common or any other kind used for that purpose.

Having thus fully described my invention, what I claim, and desire to secure by Letters Patent thereon, is—

1. The tightener K, in combination with the cord G, arranged around the pulleys F and *g*, when combined with the other parts in the manner described, substantially as shown, and for the object described.

2. The employment, in a curtain-fixture, of detachable or open pulleys, of the form substantially as shown and described.

3. The holder D, when so constructed as to be readily attached to or detached from the endless cord E after said cord is in position over the pulleys, substantially as specified and shown.

4. The combination of the holder D and pivot *c*, when the holder is made detachable therefrom, for the purpose specified and shown.

5. The combination of the endless cord E and the detachable adjustable holder D, substantially as and for the purpose specified.

6. The combination of the endless cord G, the roller C, and the cord E, for holding the roller at any point while the cord G turns it to raise or lower the curtain, as specified and shown.

L. CORYDON PRINDLE.

Witnesses:
GEO. R. CUPPS,
W. E. HALL.